(12) United States Patent
Adamczuk

(10) Patent No.: US 6,704,113 B1
(45) Date of Patent: Mar. 9, 2004

(54) NON-DESTRUCTIVE SURFACE INSPECTION AND PROFILING

(76) Inventor: Juliusz W. Adamczuk, 5484 Beach St., Riverside, CA (US) 92509

( * ) Notice: Subject to any disclaimer, the term of this patent is extended or adjusted under 35 U.S.C. 154(b) by 0 days.

(21) Appl. No.: 09/537,954

(22) Filed: Mar. 28, 2000

(51) Int. Cl.$^7$ ................................................ G01B 11/00
(52) U.S. Cl. .................. 356/601; 250/459.1; 250/458.1
(58) Field of Search .............................. 356/601, 237.4, 356/237.5, 237.6; 250/458.1, 459.1, 372, 503.1, 504 R; 430/328, 370; 382/146, 147, 154

(56) References Cited

U.S. PATENT DOCUMENTS

| | | | | |
|---|---|---|---|---|
| 4,651,011 A | * | 3/1987 | Ors et al. ................. | 250/459.1 |
| 4,670,528 A | * | 6/1987 | Taylor et al. ............... | 526/263 |
| 4,802,762 A | * | 2/1989 | Hill, Jr. ...................... | 356/318 |
| 4,971,895 A | * | 11/1990 | Sullivan ..................... | 430/328 |
| 5,278,451 A | * | 1/1994 | Adachi et al. .............. | 257/790 |
| 5,711,839 A | * | 1/1998 | Dronzek, Jr. ............... | 156/277 |
| 6,091,491 A | * | 7/2000 | Chisholm et al. ........... | 356/301 |
| 6,278,797 B1 | * | 8/2001 | Nagasaki et al. ........... | 382/146 |

FOREIGN PATENT DOCUMENTS

| WO | WO 93/09925 | * | 5/1993 |
|---|---|---|---|

* cited by examiner

*Primary Examiner*—Frank G. Font
*Assistant Examiner*—Sang H. Nguyen
(74) *Attorney, Agent, or Firm*—James G O'Neill; Klein O'Neill & Singh, LLP

(57) ABSTRACT

Non-destructive inspection and profiling of a surface of a material or an object is performed by forming an image of a selected area of the surface of the material, and processing the image in a computer to create usable information. The image of the selected area is formed by: applying a selected polymer mixture to a clear substrate; applying the polymer mixture on the clear substrate to the selected area; allowing the polymer mixture to polymerize and form a mold; lifting the polymerized polymer mixture mold from the selected area; passing light through the formed mold to form an image of the surface; and registering the formed image on an electronic media for further handling.

20 Claims, No Drawings

NON-DESTRUCTIVE SURFACE INSPECTION AND PROFILING

BACKGROUND OF THE INVENTION

1. Field of the Invention

This invention relates generally to material surface inspection and profiling, and, more particularly, to a non-destructive method for inspecting and profiling a surface.

2. Description of Related Art

The testing of a material normally requires that a piece of the material to be tested be brought to the equipment used for testing. This necessitates the obtaining of a sample of the material, as by cutting off or removing a portion of the material. Additionally, the cut off or removed sample must then be transported to the equipment to perform the necessary tests, necessitating further delays. Such delays are sometimes substantial, due to delays in shipment, furthermore, once received, the sample then must be prepared and wait to be tested.

Therefore, there exists a need in the art for a process for quickly and easily testing a surface of a material or an object without requiring the removal of any portion of the material or the object, and which can be performed in situ, or which may be easily shipped to a lab, or the like, for further testing and extrapolation thereof.

SUMMARY OF THE INVENTION

Accordingly, it is a general object of the present invention to provide an improved and simplified process of inspecting the surface of a material. It is a particular object of the present invention to provide an improved and simplified, non-destructive surface inspecting and profiling method. It is another particular object of the present invention to provide an improved and simplified non-dstructive process utilizing a thin polymer impression for extrapolating information about the surface of a material or an object. And, it is a still further particular object of the present invention to provide an improved and simplified method of non-destructive testing, utilizing a polymer mixture to form an impression of a surface, passing light through an impression of the surface formed in the polymer, and obtaining an electronic image of the surface, which electronic image may then be manipulated and/or studied by a computer.

These and other objects of the present invention are obtained by providing a method for non-destructive inspection and profiling of a surface of a material. The method includes the steps of selecting a polymer mixture, applying the selected polymer mixture to a surface to be tested, lifting the polymer mixture off the tested surface after a predetermined period of time, passing a light through the polymer mixture to form an image of the tested surface, and processing the image in a computer to create usable information about the tested surface.

DETAILED DESCRIPTION OF THE PREFERRED EMBODIMENT

The following description is provided to enable any person skilled in the art to make and use the invention, and sets forth the best modes contemplated by the inventors of carrying out their invention. Various modifications, however, will remain readily apparent to those skilled in the art, since the generic principles of the present invention have been defined herein, specifically to provide for an improved and simplified method for the non-destructive inspection and profiling of a surface of a material or an object.

Generally, the process of the present invention allows the extrapolation of information about the surface of a material or an object by first creating a thin polymer impression of a portion of the surface, and by then passing light through this polymer impression. The light passing through the polymer impression is then captured on an electronic media, so as to form an image of the tested portion of the surface, which image may then be manipulated by computer software to process the data obtained therefrom, and to profile the tested surface. The improved process of the present invention involves the steps of selecting an area on a material or an object to be tested, then selecting a polymer mixture, which is applied to the selected area in a special way. The polymer mixture is then allowed to cure or set so that a thin, flat impression or mold of the tested surface is created. The thin mold is then removed from the tested surface area and brought to a light source where light is allowed to pass through the thin, flat mold so as to register the surface on electronic sensing means and form an image. The obtained image is then entered into a computer, if not already done so, and manipulated by software in the computer to create useful information about the tested surface, including numeric data, profile graph, surface graph, a 3-D surface simulation of the tested surface, etc.

To obtain the best results with the present invention, all tested surfaces should be clean and dry, that is, free from dirt and loose particles. If necessary, the surface from which the impression is to be taken may be first washed with an appropriate solvent or water, and dried, for example, with a stream of compressed air. In those instances where it is necessary to obtain information about the thickness of any corrosion, a part of the tested area can be treated with a chemical to dissolve all oxidized metal, so as to expose bare metal. An impression may then be made of the border of the exposed and oxidized metal so as to obtain an extrapolation of the thickness of the corrosion.

The process of the present invention is specifically applicable to accessing the condition of the components of critical systems in the field where errors can lead to large expenses requiring replacement and/or endangering the lives and safety of people and property. For example, the process of the present invention can be used to test the corrosion of a metal surface, including depth of corrosion pitting. Furthermore, the process of the present invention can be used to test the condition of electrical cables, whether above ground or underground, or the surface of any material or object that is exposed to chemicals or harsh environments, such as corrosive gases or combustible hot gases, that may cause pitting, material weakening, or other problems. Further examples of where the process of the present invention may be used are the obtaining of difficult readings on the interiors of pipes, holding or supply tanks, airplanes or spacecraft parts, turbine engine parts, jet motor parts, internal weapon chambers and barrels, children playground sets, construction or other equipment, amusement park rides, or forensic tests for any reason.

The preferred polymer mixture used in the process of the present invention may consist of any known copolymer, such as from the family of vinyl copolymers, or polosulfides. At the present time, it has been found that the material which produces the best results is that of a polyvinylsiloxane having a small amount of a compatible (non-reactive) substance, such as a small quantity of a pigment or color dye mixed therewith. There are many commercial names for the preferred mixture of polydinethylsiloxane used in the present invention, and it is sometimes referred to as a vinyl copolymer with a fuse of silicone. That is, the preferred polymer mixture is merely (vinyl) terminated polydimethylsiloxane (vinyl polysiloxane (VPS)). This family of polymers was chosen because of its ability to form a third molecule from two reacting molecules, without producing any by-products, which would cause dimensional instability.

The vinyl polysiloxane (polydimethylsiloxane) is mixed with from 0.1% to 4% by mass of a pigment or dye. The 0.1% to 4% of the pigment or dye mixed with the polydimethylsiloxane is needed to achieve the optimum optical density of the thin, flexible polymer impression formed of a tested area. For example, to test for pitting in a surface in the 200 micron range, the mixture needs to contain less pigment and/or dye to achieve the optimum level of transparency. While in a situation where surface pitting is in the 25 micron range, a greater amount of the same pigment or dye is needed to achieve the same optimum transparency level.

The pigment or dye added or mixed with the polydimethylsiloxane should be compatible and very fine. That is, the fine pigment or dye should have particle sizes which are at least 5 times smaller than the highest achievable optical resolution.

The primary reason for using the pigment or dye is to make the normally clear polymer less translucent. That is, the particles of pigment or dye will provide a resistance to light passing through an impression formed with the mixture. The variation in physical thickness of the thin, flexible mold or impression will form an image when light is passed therethrough. The thinner areas of the impression (offering less light resistance) will appear lighter; while the thicker areas will appear darker to a sensor.

In essence, the polymer mixture will cause an automatic translation of the variations in thickness in the formed impression, to variations in light intensity on a sensor.

Normally, to measure or otherwise quantify surface pitting between 900 and 0.2 microns is extremely difficult and requires very expensive laboratory equipment. However, the process of the present invention, using measurements of the intensity and/or other properties of light, provides accurate results in a cheaper, easier and faster manner.

A second reason for using pigment or dye in a polymer mixture is for coding of material mixtures and of surface impressions made with various colors.

Before polymerization, the elements of the selected polymer mixture consisting of one part catalyst and one part base, are mixed and then applied to a flat carrier or substrate, such as a clear, flexible strip made from plastic, such as a vinyl film. The flat substrate helps apply the selected polymer mixture, and allows the creation of a flat polymer impression. Without this flat polymer impression, the necessary information may not be extracted from the tested surface. For example, in a number of tests performed to prove the efficacy of the present invention, a small blob of the selected polymer mixture was spread on a thin strip of clear plastic material so as to form a substantially circular portion about the size of a United States one cent piece. The selected polymer mixture must be sufficiently hydrophilic, so that when it is applied to a surface, all small openings or spaces on the surface will be filled thereby, even if trace moisture is present. After the polymer mixture is applied to the area of the surface to be tested, the polymerization time of the mixture should be no longer then 1 to 5 minutes, at temperatures between 10° C. and 32° C., so that not too much time is spent in waiting for the applied polymer mixture to polymerize. The curing time declines or increases about 15 seconds for each 2° C. difference in temperature. Additionally, the preferred polymer mixture of the present invention must have a relatively low surface tension to many materials, including metals, and to be sufficiently thixotropic, so that it will flow easily over a surface and so that it will sustain its shape when external forces are removed. The viscosity of the selected polymer mix can be regulated, when preparing the mixture, so as to be capable of use on a variety of surface and in different positions, for example, horizontal, overhead or vertical surfaces, as well as under different climate conditions.

After the selected polymer mixture has been applied to the selected area of a surface by a substrate and has been polymerized, the thin pliable impression, film or mold formed thereby should have good flexural strength, sufficient transparency so that a light may be passed therethrough, allow no linear shrinkage, have high dimensional accuracy, and allow very precise line reproduction to insure that accurate readings of a tested surface may be made. In addition, the polymer mixture should have good workability, be non-toxic, and easily handled and applied in a wide range of temperatures and working conditions.

As discussed, the selected polymer mixture is first applied to a clear carrier or substrate, such as a flexible vinyl strip, applied to a portion of a surface to be tested, and allowed to cure to form a thin, flexible impression or mold of the surface on one side, with a flat opposite side. After polymerization, the clear carrier and mold are then lifted off the surface and moved, for example, adjacent to a light source and/or a laptop or portable computer, where an image of the mold is formed and collected, or registered by a light source, for example, by a CCD camera sensor. The image thus obtained may then be entered into a computer, such as a laptop, and processed by available or custom software in the computer. The image obtained may be digitized, using well-known methods, such as by software to transform film negatives and transparencies. The information thus obtained may be then stored in the laptop computer or moved to a further computer for processing at a later date. If placed in a laptop at a site, the image may be manipulated in the field to obtain early readings of the tested surface.

The software used with the computer to process the image obtained should be of a type which provides the necessary automatic translation of variations in thickness to variations in light intensity. The cumulative density of dispersed particles in the polymer mixture at a given point will be translated to a non-linear variance of light passing through it. The computer will only manipulate the values of this variance of light. These values are compared to a signature of the mixture used. The signatures are non-linear curves that are stored in the computer, and used by the software in the form of a comparison table. The software should also include the necessary software filters to remove all background noise, provide medium error correction, compensate for dispersion and self-illuminating effects, and to provide auto-calibration to standard samples. The computer or computers used should allow a number of three-dimensional arrays to be formed for viewing and manipulation of the image of the surface obtained from the impression or mold.

It, thus, can be seen that the non-destructive inspection and profiling of a surface method of the present invention is easy to use and provides quick and accurate results, both in the field, or in a laboratory. An image to be processed by software in a computer is obtained by first placing a selected polymer mixture on a clear carrier for application to a portion of a surface to be tested, allowing the polymer mixture to polymerize and to form a thin, flexible impression or mold of the surface area covered by the polymer mixture, removing the clear carrier strip holding the formed mold, allowing light to pass through the mold to form an image, capturing the formed image on an electronic media, entering the electronic media into a computer, and selectively manipulating the image formed by the electronic media, by known or custom software, to create usable information about the surface tested, and the material and/or object from which it was taken.

Each polymer mixture used will have its own signature. The signature is obtained and stored in a computer by applying the mixture to a standard sample where the depths of pitting are known. The obtained signatures (non-linear curves) of the polymer mixture is used to overcome the non-linear feature of this method and allows high precision measurements to be cheaply and easily made.

Those skilled in the art will appreciate that there are adaptations and modifications of the just-described preferred embodiments that can be configured without departing from the scope and spirit of the invention. Therefore, it is to be understood, that within the scope of the intended claims, the invention may be practiced other than is specifically described herein.

What is claimed is:

1. A method for nondestructive surface inspection and profiling of a material, comprising the steps of:
    selecting an area of the material to be tested;
    selecting a polymer mixture;
    applying the selected polymer mixture to a surface in the selected area of the material;
    allowing the applied selected polymer mixture to polymerize on the surface;
    lifting the polymerized polymer mixture from the surface; and
    processing the polymerized polymer mixture lifted from the surface to create usable information of the surface of the material.

2. The method of claim 1, further including the step of first applying the selected polymer mixture to a clear carrier before applying the polymer mixture to the surface.

3. The method of claim 2, further including the step of allowing the polymerized polymer mixture to form a mold of the surface to which it is applied.

4. The method of claim 3, further including the steps of passing light through the mold of the surface formed by the polymerized polymer mixture, and obtaining an image of the mold of the surface.

5. The method of claim 4, further including the step of selecting the polymer mixture from the family of vinyl copolymers, or polysulfides.

6. The method of claim 4, further including the step of selecting the polymer mixture from a vinyl copolymer mixed with a small quantity of a color dye or pigment.

7. The method of claim 4, further including the step of processing the image of the mold of the surface in a computer to selectively obtain depth of any surface pitting, measure areas of any surface pitting, measure distance between points of interest on the image, calculate theoretical loss of mass of the surface, and to calculate the percentage of differences between an ideal surface and the tested surface.

8. The method of claim 1, further including the step of selecting the polymer mixture from the family of vinyl copolymers or polysulfides.

9. The method of claim 8, further including the step of first applying the selected polymer mixture to a clear, flexible plastic carrier before applying the polymer mixture to the surface.

10. The method of claim 9, further including the step of allowing the selected polymer mixture to polymerize on the surface to which it is applied to form a mold of the surface, which mold has a flat surface where it is held on the clear, flexible plastic carrier.

11. The method of claim 10, further including the steps of passing light through the mold of the surface formed by the polymeried polymer mixture, and obtaining an electronic image of the mold of the surface.

12. The method of claim 11, further including the step of processing the image of the mold of the surface in a computer to selectively obtain depth of any surface pitting, measure areas of any surface pitting, measure distance between points of interest on the image, calculate theoretical loss of mass of the surface, and to calculate the percentage of differences between an ideal surface and the tested surface.

13. A method for non-destructive surface inspection and profiling of a material, comprising the steps of:
    selecting an area of the material to be tested;
    selecting a polymer mixture;
    applying the selected polymer mixture to a clear substrate;
    applying the selected polymer mixture by means of the clear substrate to a surface on the selected area of the material;
    allowing the selected polymer mixture to polymerize on the surface to form a mold;
    lifting the clear substrate and formed mold from the surface; and
    processing the formed mold of the surface to create usable information of the surface of the tested area.

14. The method of claim 13, further including the step of selecting the polymer mixture from a family of vinyl copolymers or polysulfides.

15. The method of claim 13, further including the steps of passing light through the formed mold of the surface to obtain an image of the surface, and processing the obtained image.

16. The method of claim 13, further including the step of selecting the polymer mixture from a family of vinyl copolymers, and adding a small quantity of a selected pigment or dye color thereto.

17. The method of claim 16, further including the steps of passing light through the formed mold of the surface to obtain an image of the surface, and processing the obtained image.

18. The method of claim 17, further including the step of processing the obtained image in a computer to selectively obtain selected parameters of the tested surface including: depth of any surface pitting, measure of areas of any surface pitting, measure of distance between points of interest on the obtained image, calculate theoretical loss of mass of the surface, and to calculate the percentage of difference between the tested surface and an ideal surface.

19. The method of claim 13, further including the steps of passing light through the formed mold of the surface to obtain an image of the surface, and processing the obtained image in a computer.

20. A method for non-destructive surface inspection and profiling of a surface of a material, comprising the steps of:
    selecting an area on the surface to be tested;
    selecting a polymer mixture from a vinyl copolymer mixed with from 0.1% to 4% by mass of a selected dye or pigment color;

applying the selected polymer mixture to one-side of a clear, flexible, plastic carrier;

applying the one side of the clear, flexible plastic carrier with the selected polymer mixture thereon to the selected area;

allowing the selected polymer mixture to polymerize to form a mold of the surface to which it is applied; the formed mold having a flat surface where it is held on the clear, flexible plastic carrier;

lifting the clear, flexible plastic substrate and the formed mold from the surface;

passing light through the formed mold of the surface to form an image; and processing the formed image in a computer to create usable information about the tested surface.

* * * * *